United States Patent [19]

Hidai et al.

[11] Patent Number: 4,732,601

[45] Date of Patent: Mar. 22, 1988

[54] APPARATUSES FOR PRODUCING PLATE GLASSES

[75] Inventors: Tadakazu Hidai; Toshikazu Kondo, both of Ichihara, Japan

[73] Assignee: Nippon Sheet Glass Co., Ltd., Osaka, Japan

[21] Appl. No.: 19,053

[22] Filed: Feb. 26, 1987

[30] Foreign Application Priority Data

Feb. 28, 1986 [JP] Japan .................................. 61-44795

[51] Int. Cl.⁴ .............................................. G03B 5/20
[52] U.S. Cl. .......................................... 65/184; 65/99.5; 65/182.5; 65/340; 65/342; 65/345; 65/343
[58] Field of Search ....................... 65/99.1, 99.2, 99.4, 65/99.5, 182.5, 338, 339, 340, 342, 343, 345, 344, 184

[56] References Cited

U.S. PATENT DOCUMENTS

| 1,538,215 | 5/1925 | Reece .................................... 65/343 |
| 1,614,114 | 1/1927 | Fowle .................................... 65/343 |
| 3,351,452 | 11/1967 | Robinson ........................... 65/184 X |
| 3,676,099 | 7/1972 | Fultz ................................. 65/339 X |
| 3,884,665 | 5/1975 | Edge et al. ...................... 65/182.5 X |

FOREIGN PATENT DOCUMENTS 667700 1/1950 United Kingdom .................. 65/342

Primary Examiner—Arthur Kellogg
Attorney, Agent, or Firm—Wenderoth, Lind & Ponack

[57] ABSTRACT

An apparatus for producing a plate glass which comprises
(A) a melter for storing a molten glass material,
(B) a molding portion for molding the molten glass material from the melter into a plate,
(C) a temperature adjusting tank located between the melter and the molding portion for maintaining the molten glass material from the melter at a uniform temperature, said temperature adjusting tank having a glass material channel for introducing the molten glass material maintained at the uniform temperature into the molding portion in a position facing on the molding portion, and
(D) a tweel for adjusting a flow rate of the glass material which is raisable and lowerable in the glass material channel and has a hole through which a surface layer stream of the molten glass material can be separated and passed in the glass material channel.

3 Claims, 8 Drawing Figures

APPARATUSES FOR PRODUCING PLATE GLASSES

This invention relates to an apparatus for producing a plate glass, and more specifically to an apparatus for producing a plate glass wherein a glass material containing a volatile component, such as a borosilicate glass material, is continuously molded into a plate glass.

In a process for producing glasses containing volatile components such as a borosilicate glass, since volatile components such as boric acid and alkali components are volatilized from the surface layer of glass materials, it is unescapable that a layer having ratios of components different from the inside is formed as a surface layer. Accordingly, when such glasses are shaped by common methods of producing plate glasses such as a float bath method and a roll-out method, knots, reams, warps, etc. occur unless glasses of different nature on the surface are removed.

Applicant proposed before an apparatus for producing a plate glass containing volatile component such as a borosilicate glass by common methods such as a float bath method, etc. (Japanese Laid-open Patent Application No. 231426/85).

This apparatus for producing the plate glass is characterized in that a separation plate for separating and removing a surface layer stream of the glass material is mounted upstream of a tweel for adjusting the flow rate of the glass material between a tank for adjusting a temperature of the glass material and a molding portion. However, in the apparatus for producing the plate glass, the surface layer stream of the glass material is not altogether smoothly separated and removed through the separation plate mounted upstream of the tweel. Consequently, the surface layer stream of the glass material on the upstream side of the tweel is slowed down and volatile components such as boric acid and alkalis are volatilized from the glass material, so that the surface of the glass material comes to have a high viscosity, becomes like a taut skin and is stagnated on the upstream side of the tweel. On this occasion, a high-viscosity surface layer stream enters at times under the separation plate, passes beneath the tweel, and flows into the molding portion to allow formation of a glass of different nature in the center of the resulting plate glass.

An object of this invention is to provide an apparatus for producing a plate glass.

A further object of this invention is to provide an apparatus for continuously producing a plate glass from a glass material containing volatile components.

Another object of this invention is to provide an apparatus for continuously producing a plate glass of a uniform composition by smoothly separating and removing a portion of a different composition formed as a surface layer of a glass material containing volatile components from a glass material of a uniform composition.

Still another object of this invention is to provide an apparatus for producing a plate glass free of knots, reams or warps from a glass material containing volatile components.

The other objects and advantages of this invention can be clarified from the following explanation.

The above objects and advantages of this invention can be basically achieved by an apparatus for producing a plate glass which comprises (A) a melter for storing a molten glass material, (B) a molding portion for molding the molten glass material from the melter into a plate, (C) a temperature adjusting tank located between the melter and the molding portion for maintaining the molten glass material from the melter at a uniform temperature, said temperature adjusting tank having a glass material channel for introducing the molten glass material maintained at the uniform temperature into the molding portion in a position facing on the molding portion, and (D) a tweel for adjusting a flow rate of the glass material which is raisable and lowerable in the glass material channel and has a hole through which a surface layer stream of the molten glass material can be separated and passed in the glass material channel.

Figure 1:
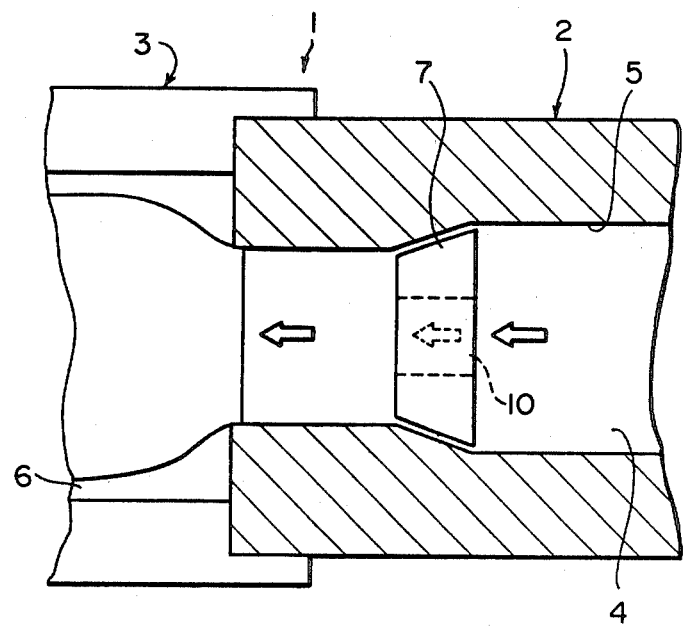
FIG. 1 is a partial plan view of an example of an apparatus for producing a plate glass in this invention.

The apparatus for producing the plate glass in this invention is suited to known methods for producing plate glasses such as a float bath method and a roll-out method.

In the apparatus for producing the plate glass in this invention, a melter (A) is to store a molten glass material to produce a plate glass, and has a structure known per se.

The molten glass material from the melter (A) is introduced into a molding portion (B) for molding it into a plate glass. The molding portion (B) is also known per se. For example, in a float bath method, a molten metal is stretched on the molding portion to form a flat surface of a plate glass with the flat surface of the molten metal.

The molten glass brought into the molding portion (B) is, before guided from the melter (A) to the molding portion, first introduced into a temperature adjusting tank located between the melter (A) and the molding portion (B) for maintaining the molten glass material from the melter at a uniform temperature. Said temperature adjusting tank (C) has a glass material channel for introducing the molten glass material maintained at the uniform temperature into the molding portion in a position facing on the molding portion. Said channel has, for example, a width of 12 cm to 1 m, a depth of 10 to 30 cm and a length of 80 cm to 3 m.

As mentioned above, the molten glass material is first introduced from the melter to the temperature adjusting tank where it is adjusted to a temperature suitable for molding, then brought into the molding portion via the channel of the temperature adjusting tank, and molded into a plate glass.

The apparatus of this invention is provided with, in addition to the requirements (A), (B) and (C), a tweel for adjusting a flow rate of the glass material fed from the temperature adjusting tank to the molding portion.

The tweel (D) for adjusting the flow rate of the glass material in this invention is raisable and lowerable in the glass material channel and has a hole through which a surface layer stream of the molten glass material can be separated and passed in the glass material channel.

The feature of the tweel (D) for adjusting the flow rate of the glass material in the apparatus of this invention lies in that the surface layer stream of the glass material is separated from the glass material in the inside and passed through the hole so as to eliminate such stagnation of the surface layer stream on the upstream side of the flow rate adjusting tweel as occuring in the conventional apparatus. The tweel (D) employed in this invention is, as noted above, raisable and lowerable in the glass material channel and usually suspended in a raisable and lowerable manner. An interval between the bottom of the tweel and the surface of the glass material channel can be adjusted on raising or lowering the tweel, thereby adjusting the amount of the glass material fed to the molding portion. Thus, even when the glass material fed to the molding portion is adjusted to a suitable amount on raising or lowering the tweel, at least part of the hole in the tweel is submerged in the molten glass material to pass the surface layer of the molten glass material.

The apparatus in this invention can withdraw the surface layer stream of the glass material flowing from upstream of the tweel in the advancing direction of the glass material through the hole of the tweel and adjust the flow rate of the glass material passing through the hole with the depth and temperature of the glass material. Since on this occasion the speed of the surface layer stream goes high, change in composition owing to volatilization of volatile components such as boric acid and alkali components is minimized.

The apparatus for producing the plate glass in this invention is preferably provided with a guide portion (E) for introducing the surface layer stream of the glass material from the hole of the flow rate adjusting tweel into both sides of the glass material channel, said guide portion being located downstream of the flow rate adjusting tweel within the glass material channel.

The guide portion (E) introduces the surface layer stream of the glass material flowing from upstream of the tweel to both sides of the channel past the hole of the tweel, thereby preventing the surface layer stream from stagnating on the upstream side of the tweel and entering under the tweel. As a result, a glass of different nature does not flow into the center of the glass plate.

The apparatus for producing the plate glass in this invention is more preferably provided with, in addition to the guide portion (E), a member (F) for controlling the surface layer stream of the glass material which is raisable and lowerable upstream of the flow rate adjusting tweel within the glass material channel, controls the surface layer stream of the glass material and leads it to the hole of the flow rate adjusting tweel.

The member (F) for controlling the surface layer stream gives an advantage that when the flow rate of the glass material is controlled with the tweel, the surface layer stream alone can be fed into the hole of the tweel separately from the adjustment of the flow rate of the glass material.

Referring to embodiments shown in the attached drawings, the apparatus for producing the plate glass in this invention can be explained in more detail.

Figure 2:
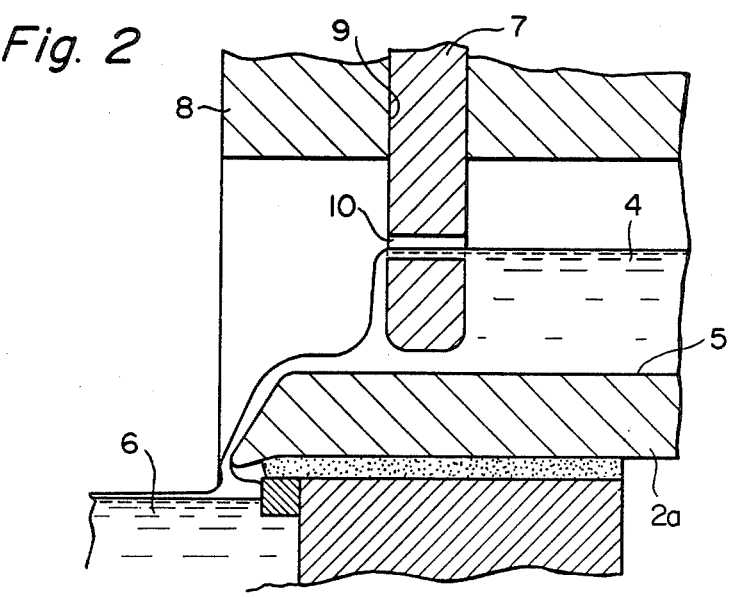
FIG. 2 is a sectional view of an essential part of the apparatus in FIG. 1.

In FIGS. 1 and 2, a molding portion (3) is arranged downstream of a temperature adjusting tank (2) in an apparatus (1) for producing a plate glass. A glass material (4) molten in a melter flows into a channel (5) formed in the temperature adjusting tank (2). While flowing through the channel (5), the glass material (4) is maintained at the uniform temperature, then flows out onto, for example, a molten tin bath (6) and is formed into a plate glass.

By the way, the channel (5) is narrowed midway, and a tweel (7) is located just before the narrowed position. The tweel (7) is, as shown in FIG. 2, raisable and lowerable through a slit (9) formed in a ceiling portion (8) of the temperature adjusting tank (2), and its lower portion is placed within the channel (5). The flow rate of the glass material (4) can be adjusted by changing the upper and lower positions of the tweel (7) depending on the depth and temperature of the glass material.

The tweel (7) is provided in the lower portion with a hole (10) through which the upper layer stream of the glass material (4) is separated and led to the molding portion (3). The formation of the hole (10) in the lower portion of the tweel (7) enables the upper layer stream of the glass material (4) to flow into the molding portion (3) as such at a given speed of flow without stopping its flow by the tweel (7). Since the speed of flow of the surface layer is high, change in composition due to volatilization of volatile components such as boric acid and alkali components from the surface of the glass material (4) can be minimized, preventing formation of a glass layer of different nature on the surface of the plate glass after molding.

Figure 3:
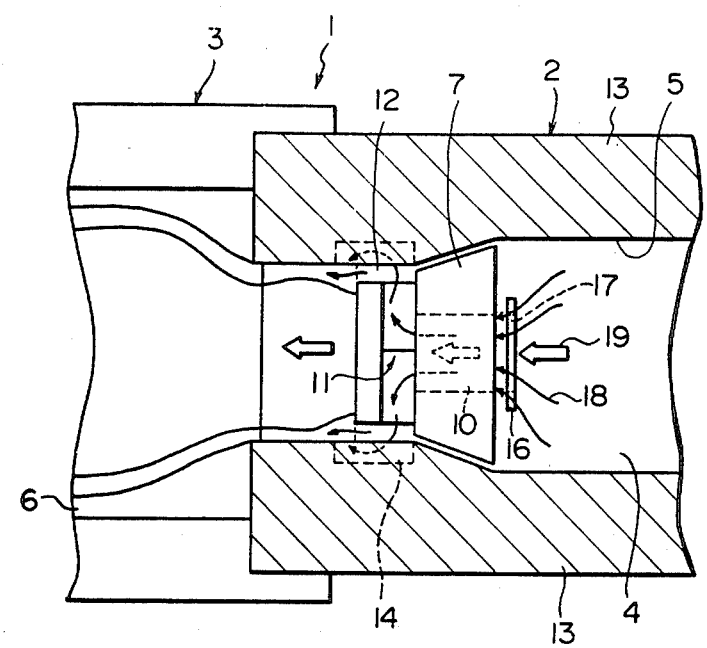
FIG. 3 is a partial plan view of another example of the apparatus for producing a plate glasss in this invention.
Figure 4:
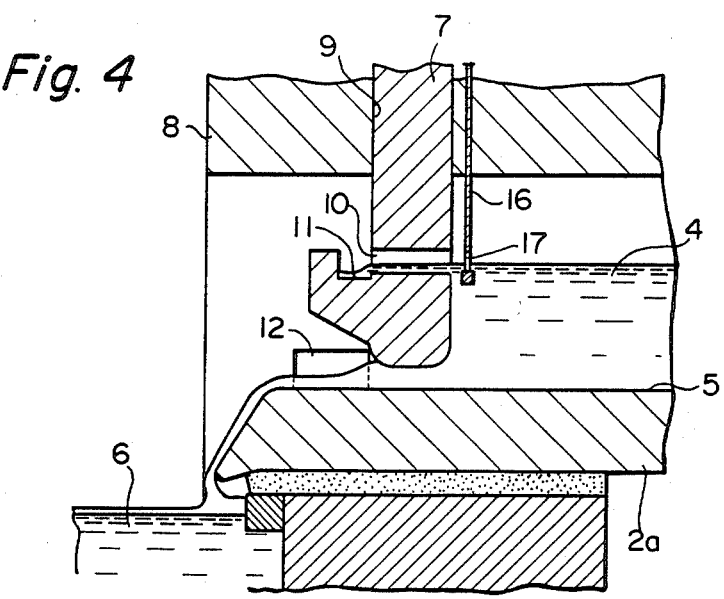
FIG. 4 is a sectional view of an essential part of the same apparatus in FIG. 3.

FIGS. 3 and 4 are each a view showing a producing apparatus of another working example in this invention. The same reference numerals are allotted to the same members in the working example shown in FIGS. 1 and 2.

In this working example, the tweel (7) is provided on the lower portion with a guide portion (11) for leading the surface layer stream flowing out of the hole (10) into both sides of the channel (5), said guide portion being integrated or contacted with the tweel (7). Said guide portion (11) forms an inclined surface falling down from the center to both sides. A brick block (12) for receiving a glass material is further mounted which introduces the surface layer stream of the glass material descending along the inclined surface of the guide portion (11) to surely form ear portions of a glass belt. A notch (14) is formed in a side wall (13) of the temperature adjusting tank (2) correspondingly to the brick block (12).

Figure 5:
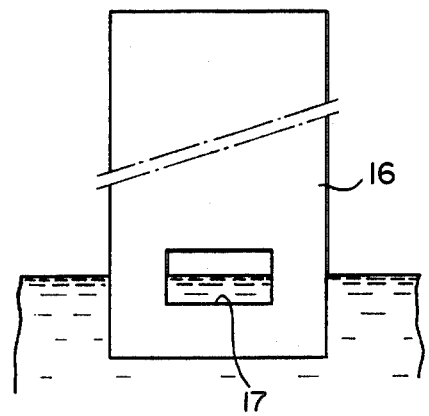
FIG. 5 is a rough front view of an example of a control member of a glass material surface layer stream constituting a part of the apparatus for producing the plate glass in this invention.

A member (16) for controlling the surface layer stream of the glass material (4) is disposed upstream of the tweel (7) in a raisable and lowerable manner. The member (16) for controlling the surface layer is, as shown in FIG. 5, provided with a hole (17) opposite to the hole (10) of the tweel (7) by raising or lowering.

The member (16) for controlling the surface layer stream may be of such form as not to stagnate the surface layer stream and formed of refractory. More preferable is that the member (16) for controlling the surface layer stream is made of platinum or a platinum-rhodium alloy which does not contaminate or corrode the glass material (4).

In view of the foregoing, the surface layer stream of different nature obtained by volatilizing boric acid in the glass material flowing through the channel (5) flows into the hole (10) of the tweel (7) via the hole (17) of the member (16) for controlling the surface layer stream as shown by an arrow (18) in FIG. 3, drawn out in the advancing direction of the glass material and separated. Moreover, the surface layer stream is separated right and left along the inclined surface of the guide portion (11), flows down, is introduced into the brick block (12) and settled, flows out in a ribbon shape on the tin bath (6) of the molding portion (3) past a spout lip (2a) and is formed into ear portions of the glass belt shaped into a plate.

On this occasion, the surface layer stream of different nature obtained by volatilizing the volatile components such as boric acid is withdrawn at the hole (10) of the tweel (7) in the advancing direction of the glass material (4) and separated. Consequently, it is avoidable that the tweel (7) stops the surface layer stream to stagnate it on the upstream side of the tweel (7) and passes it under the tweel (7), and that the glass of different nature flows into the center of the glass plate.

It is profitable that when the tweel (7) goes down to decrease the amount of the glass material flowing into the tin bath (6), the member (16) for controlling the surface layer stream goes up and when the tweel (7) goes up to increase the amount of the glass material, the member (16) for controlling the surface layer stream goes down.

The other portion than the surface layer stream of the glass material (4) is, as shown by an arrow (19), passed under the tweel (7) and flows out onto the tin bath (6) to form a net width portion of a glass belt. Since the other portion than the surface layer stream takes a very short time until it passes under the tweel (7) and flows out onto the tin bath (6), volatilization of alkalis or boric acid does not occur, and a uniform plate glass free of knots, reams, etc. is formed within the net portion of the glass belt.

Figure 6:
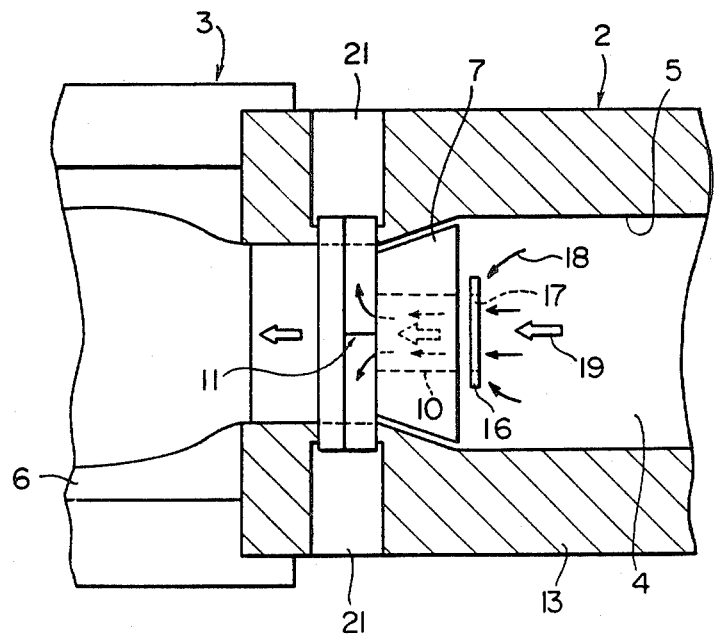
FIG. 6 is a partial plan view of another example of the apparatus for producing the plate glass in this invention.

In the apparatus in FIG. 6, discharge paths (21), (21) are formed in side wall portions (13) of the temperature adjusting tank (2), and both sides of the guide portion (11) face on the discharge paths (21), (21). Said discharge paths (21), (21) are connected with a recovering device, etc. not shown.

Thus, the surface layer stream of the glass material (4) are, as shown by an arrow (18), introduced into the discharge paths (21), (21) from the guide portion (11), discharged outside, recovered and reused. Meanwhile, the other portion than the surface layer stream, which does not undergo volatilization of volatile components, flows out onto the tin bath (6) as shown by an arrow (19) and is formed into a plate glass.

There is an advantage that as the ear portion of the glass material (4) flowing out onto the tin bath (6) is, unlike the working example in FIG. 3, quite free of a portion of different nature, warp in the ear portion can be completely prevented. Moreover, though in the working example in FIG. 3 a portion of different nature is formed in the ear portion, the apparatus in FIG. 6 has an advantage that the amount of the molten glass relative to the amount of the product can be minimized.

Figure 7:
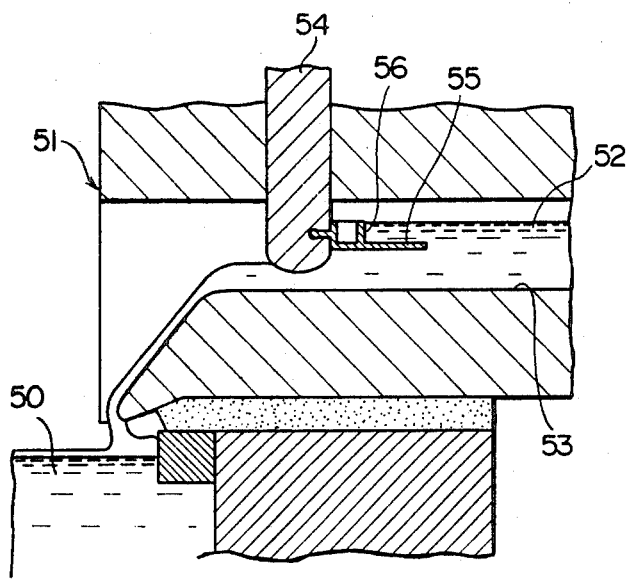
FIG. 7 is a partial sectional view of a conventional apparatus for producing a plate glass.
Figure 8:
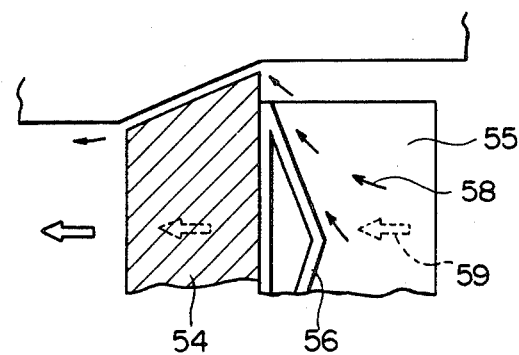
FIG. 8 is a partial plan view of an essential part of the conventional apparatus in FIG. 7.

FIGS. 7 and 8 illustrate, for comparison, an apparatus for producing a plate glass disclosed in Japanese Laid-open Patent Application No. 231426/85.

To explain the apparatus for producing the plate glass, a temperature adjusting tank (51) for maintaining a glass material at a uniform temperature is mounted between a melter for storing a molten glass material and a molding portion having a molten tin bath (50). A raisable and lowerable tweel (54) for adjusting a flow rate is disposed above a channel (53) for the glass material (52) provided in the temperature adjusting tank (51). A separation plate (55) for separating a surface layer stream of the glass material (52) is mounted on the upstream side of the lower portion facing on the channel (53) of the tweel (54). Moreover, a guide portion (56) for leading the surface layer stream to both sides of the channel (53) is disposed on the separation plate (55).

According to this apparatus for producing the plate glass, the surface layer stream of different nature obtained by volatilizing volatile components such as boric acid is separated at the separation plate (55) from the glass material (52) flowing through the channel (53), passed along the upper surface of the separation plate (55) as shown by an arrow (58), and separated right and left by the guide portion (56). The separated portions are concentrated on both sides of the channel (53), settled in a position away from both ends of the separation plate (55), passed under both ends of the tweel (54) and introduced onto the tin bath (50) to form ears of a glass belt shaped into a plate.

On the other hand, the other portion than the surface layer stream of the glass material (52) is, as shown by an arrow (59), passed under the separation plate (55) and flows out onto the tin bath (50) to form a net width portion of the glass plate.

In such apparatus for producing the plate glass, the motion of the surface layer stream on the upstream side of the tweel (54) is slowed down to allow volatilization of volatile components such as boric acid and alkalis, and the surface layer stream comes to have a high viscosity and becomes like a taut skin, thereby stagnating upstream of the tweel (54). In this state, the surface layer stream flowing from upstream of the tweel (54) is not passed to both sides before the tweel (54) but comes under the separation plate (55) from upstream of the separation plate (55), and is passed under the tweel (54) into the molding portion, sometimes allowing a glass of different nature to occur in the center of the glass belt.

As has been thus far explained, according to this invention, when molding the glass material containing volatile components, such as a borosilicate glass material, into a plate glass, the surface layer stream of different nature due to volatilization is introduced into the tin bath through the hole of the tweel formed near the level of the glass material. As a result, the surface layer of the glass material is not stagnated before the tweel. Further, since the speed of the surface layer flowing into the molding portion from the upstream side through the tweel is high, change in composition due to volatilization is notably decreased in comparison with the conventional methods, making it possible to suppress occurrence of the surface layer of different nature in the resulting plate glass. Consequently, lehr breakage and poor cutting are reduced and there results a high-quality plate glass.

This invention moreover enables the surface layer stream of the glass material to be concentrated on ear portions at the point of molding or not to be fed into the molding portion, so that the surface layer stream of different nature in the glass material is not stagnated before the tweel and the flowing-out of the surface layer stream of different nature onto the center of the plate glass due to the passage of it under the tweel is completely preventable.

Still further, this invention provides the member for controlling the surface layer stream on the upstream side of the tweel in a raisable and lowerable manner. Accordingly, when the flow rate of the glass material is adjusted with the tweel, the surface layer stream alone can be fed to the hole of the tweel differently from the adjustment of the flow rate of the glass material.

What we claim is:

1. An apparatus for producing a plate glass which comprises
   (A) a melter for storing a molten glass material,
   (B) a molding portion for molding the molten glass material from the melter into a plate,
   (C) a temperature adjusting tank located between the melter and the molding portion for maintaining the molten glass material from the melter at a uniform temperature, said temperature adjusting tank having a glass material channel for introducing the molten glass material maintained at the uniform temperature into the molding portion in a position facing on the molding portion, and
   (D) a tweel for adjusting a flow rate of the glass material which is raisable and lowerable in the glass material channel and has a hole through which a surface layer stream of the molten glass material can be separated and passed in the glass material channel.

2. An apparatus for producing a plate glass which comprises
   (A) a melter for storing a molten glass material,
   (B) a molding portion for molding the molten glass from the melter into a plate,
   (C) a temperature adjusting tank located between the melter and the molding portion for maintaining the molten glass material from the melter at a uniform temperature, said temperature adjusting tank having a glass material channel for introducing the molten glass material maintained at the uniform temperature into the molding portion in a position facing on the molding portion,
   (D) a tweel for adjusting a flow rate of the glass material which is raisable and lowerable in the glass material channel and has a hole through which a surface layer stream of the molten glass material can be separated and passed in the glass material channel, and
   (E) a guide portion for introducing the surface layer stream from the hole of the flow rate adjusting tweel into both sides of the glass material channel, said guide portion being located downstream of the flow rate adjusting tweel within the glass material channel.

3. An apparatus for producing a plate glass which comprises
   (A) a melter for storing a molten glass material,
   (B) a molding portion for molding the molten glass material from the melter into a plate,
   (C) a temperature adjusting tank located between the melter and the molding portion for maintaining the molten glass material from the melter at a uniform temperature, said temperature adjusting tank having a glass material channel for introducing the molten glass material maintained at the uniform temperature into the molding portion in a position facing on the molding portion, and
   (D) a tweel for adjusting a flow rate of the glass material which is raisable and lowerable in the glass material channel and has a hole through which a surface layer stream of the molten glass material can be separated and passed in the glass material channel,
   (E) a guide portion for introducing the surface layer stream from the hole of the flow rate adjusting tweel into both sides of the glass material channel, said guide portion being located downstream of the flow rate adjusting tweel within the glass material channel, and
   (F) a member for controlling the surface layer stream which is raisable and lowerable upstream of the flow rate adjusting tweel within the glass material channel, controls the surface layer stream of the glass material and leads it to the hole of the flow rate adjusting tweel.

* * * * *